ELECTRICAL FILM RESISTORS

Original Filed May 26, 1965

United States Patent Office
3,436,254
Patented Apr. 1, 1969

3,436,254

ELECTRICAL FILM RESISTORS

Bertrand Alain Dreyfus, Sevres, France, assignor to Societe d'Electronique et d'Automatisme, Courbevoie, Hauts-de-Seine, France Continuation of application Ser. No. 459,035, May 26, 1965. This application Feb. 16, 1968, Ser. No. 706,189
Claims priority, application France, June 2, 1964, 976,774
Int. Cl. H01b 1/02; B44d 1/08; C23c 7/00
U.S. Cl. 117—201 7 Claims

ABSTRACT OF THE DISCLOSURE

Controlled modification of the range of values of resistance of tin oxide electrical film resistors is obtained by introducing, in the tin compound solution used to spray on a heated substrate for creating such films, an oxidizing agent that compensates for, in a degree depending upon its proportion, the default of oxygen in the resulting tin oxide.

CROSS-REFERENCE TO RELATED APPLICATION

Reference is made under the provisions of 35 U.S.C. 120 to copending application Ser. No. 459,035, filed May 26, 1965, now abandoned, of which the present is a continuation.

BACKGROUND OF THE INVENTION

In order to obtain tin oxide films of various resistivities for an identical thickness, it has already been proposed to make composite oxide films, i.e., to mix in the solutions halogenated compounds of other elements than tin, in sufficiently high quantities for producing on said substratum aggregates of tin and other element oxides, so that the resistivity of the film depends on the combination of the resistivities of said plural oxides.

Actually, the preparation of thin tin oxide films from the above referred method leads to the obtention of a stannic oxide of the $SnO_{2-x}$ kind, i.e., a stannic oxide having a lack of oxygen with respect to the stoichiometry. It is said default of oxygen which leads to variation of the resistivity of the films from film to film and, chiefly, prevents the obtention of high and reproducible square resistance values of the films. Thus, in such manufacture, many difficulties are encountered in trying to obtain an accurate amount of the metallic tin content in all steps of the process, from the initial solutions through to the pyrolysis.

Starting from the remark that tin oxide is a semiconductor of the N-type of conductivity, it has been disclosed in copending application Ser. No. 459,036, filed May 26, 1965, to introduce in the film a compensating doping impurity from the group of metals consisting of aluminum, indium, gallium and boron and having a P-type of conductivity. Such as impurity doping ensures the possibility of reproduction of the resistance values of the films.

The introduction of a compensating doping impurity as mentioned above, that is to say from the addition of a halogenated compound of another element than tin in the sprayed solution, for obtaining a final composite oxide aggregate on the substratum of the resistive film, is deleterious to the reproductibility of the resistance values as it is extremely difficult to ensure the stabilization of the solutions with a plurality of components therein. Hence, it is most difficult to control the formation of the various oxyhalogenides within such solutions, and also to ensure an accurate control of the proportions of such halogenides which are actually sprayed and thereafter dissociated at the contact of the heated substratum, and finally to control the various reactions of dismutation of the oxides of the aggregate, which introduce solid metal atoms which remain unoxidized in said aggregate.

Figure 1:
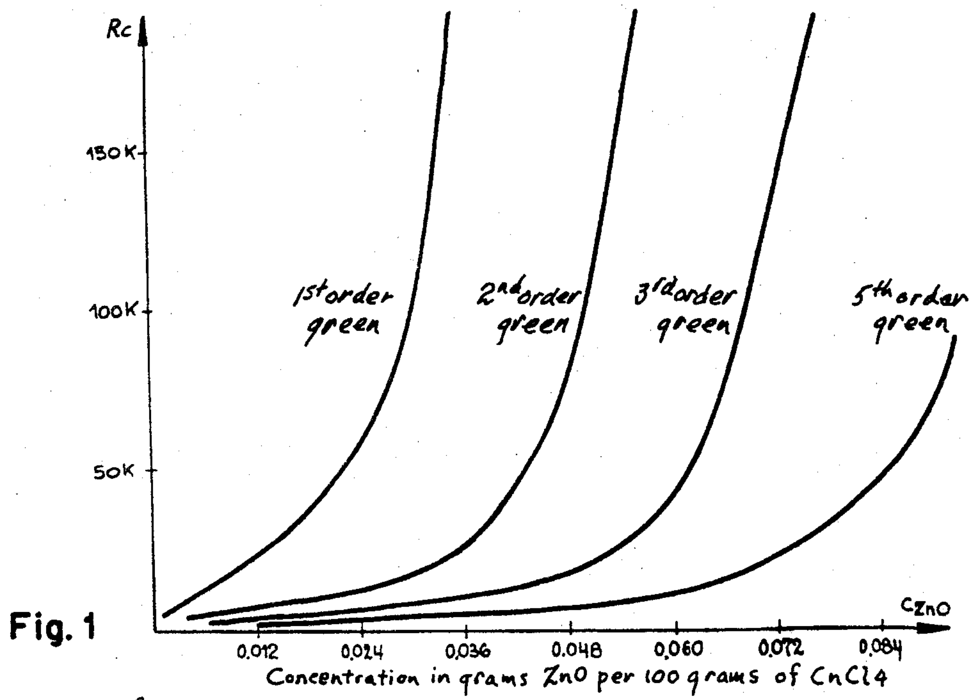

In order to eliminate such a drawback, it is provided, according to a feature of the invention, to introduce an addition modifying the range of values of the resistance of the films, not as one or more compound of other metals or elements in the solution, but as an oxidizing agent which, while contributing in a favorable direction in the oxidation reactions within the solution itself, fundamentally contributed to the oxidation reaction of the stannic oxide in its gaseous form or phase at the pyrolysis of the halogenide of tin on the heated substratum and between the sprayer and the substratum, without entering in the pyrolitic reactions proper. Such an oxidizing agent is constituted by an oxide, introduced in the solution, of a metal preferably having a structure in energy band analogous to that of the tin oxide, analogous in that said band comprises a band *d* which is full within the interdiction band of energy. This is the case for instance for the zinc oxide. A simple variation of the proportion of the zinc oxide in the sprayed solution ensures a modification of resistivity of the final tin oxide film from the compensation of the oxygen default at a more or less degree in the oxide $SnO_{2-x}$' i.e., from a more or less reduction of the quantity of free tin in the resulting film. It must be noted that the zinc oxide is only to be found in extremely small quantities in the finally produced film. Further, the quantity of zinc oxide to be introduced in the solution is relatively small, of the order of some milligrams for a weight of the tin oxide of the order of one hundred grams for instance, as the action of such oxidizing agent is quite strong for the variations of resistance of the films, as shown by the curves of the attached FIG. 1 which relate to films prepared without any compensating impurity, i.e., with just tin halide and zinc oxide solutions. Such curves are plotted with the square resistance value $R_C$ as ordinates, with a scale in kilohms, and with concentration in ZNO with respect to 100 grams of tin chloride $SnCl_2 \cdot 2H_2O$ as abscissae ($C_{Zn}$). These curves are generally parabolic and are given for thicknesses of films defined, as conventional, from the iridization color of the films, with the "green" as a reference color.

According to such parabolic presentation of these curves, the addition of zinc oxide cannot be considered as efficient unless a stabilizing impurity is also introduced in the solutions, as hereinabove stated. On the other hand, as soon as the doping impurity is present, the recourse to an oxidizing agent such as provided by the present invention ensures a stable manufacturing of reproductible characteristics of resistance films of the concerned kind, and with resistance values controlled from the quantities of the oxidizing agent within the sprayed solution.

Figure 2:
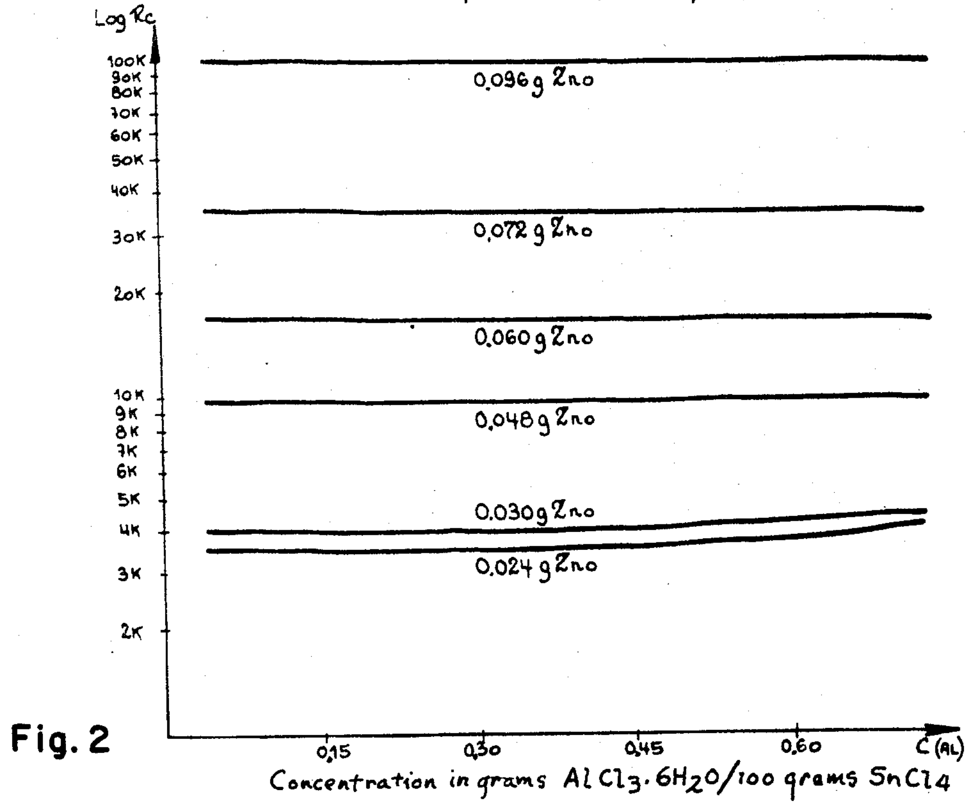

To illustrate the results obtained from the application of the invention in compensated tin oxide films, the curves of FIG. 2 are shown wherein the ordinates are plotted as log $R_C$, logarithm of the square resistance of the film termed in ohms. The abscissae plot the concentrations $C_{Al}$ in aluminum chloride $AlCl_3 \cdot 6H_2O$ for 100 gr. of tin chloride $SnCl_2 \cdot 2H_2O$. Each curve is defined by a constant quantity of zinc oxide ZnO, termed with respect to 100 gr. of tin chloride in the solutions. Said curves are given for a constant thickness of the tin oxide films, illustratively in the drawing, for the third order "green" of such films.

Illustratively, the films described by the curves of FIG. 2 have been prepared as follows: three solutions have been separately prepared for the tin chloride, the aluminum chloride and the zinc oxide. The first solution contained 100 gr. of tin chloride dissolved in 50 cc. of fuming hydrochloric acid and 300 cc. of distilled and deionized water (the water is added when the solution is used); the second solution contained 1 gr. of aluminum chloride for 1 litre of distilled and deionized water; the third solution contained 10 gr. of zinc oxide dissolved in 35 cc. of fuming hydrochloric acid and 2500 cc. of distilled and deionized water added after the solvency of the oxide into the acid. The sprayed solutions were obtained by mixing aliquotes of said three basic solutions required for and in accordance with the proportions indicated in the accompanying figures just prior to the spraying. The spraying is so made as to produce a mist of fine particles projected within an oven at the other end of which is provided a substratum of dielectric material heated to about 600° C. for the pyrolysis reaction, the temperature of said substratum and the temperature of the oven from its mouth to the substratum location being controlled from electrical heater resistors with an accurate regulation of heating therefor. The oxidizing reaction from the zinc oxide occurs, as said, within the solution to spray and within the sprayed mist within the pyrolytic oven.

The embodiments of the invention in which an exclusive property or right is claimed are defined as follows.

I claim:

1. A method of producing tin oxide electrical film resistors of controlled resistance value which comprises:
(a) providing an aqueous solution of tin halide capable of pyrolytic decomposition at a temperature about 600° C. in the presence of air into tin oxide,
(b) adding to said solution a catalytic amount of zinc oxide to effect the oxidation of the tin halide upon pyrolysis thereof, and
(c) projecting a mist of said solution onto a heated substrate having a temperature effective to pyrolyze the tin halide to form a tin oxide film on the substrate.

2. A method as claimed in claim 1 wherein said tin halide is stannous chloride.

3. A method as claimed in claim 1 wherein the amount of zinc oxide is about 12 to 96 milligrams for each 100 grams of tin halide.

4. In the production of tin oxide electrical film resistors by projecting a mist of an aqueous solution of tin halide onto a heated substrate under pyrolytic conditions effective to convert the tin halide into tin oxide, the improvement of incorporating in said aqueous solution a catalytic amount of zinc oxide to increase the conversion of the tin halide into tin oxide under said pyrolytic conditions.

5. A method as claimed in claim 4 wherein said aqueous solution containing tin halide and zinc oxide also contains a doping amount of aluminum chloride.

6. A method as claimed in claim 5 wherein said tin halide is stannous chloride.

7. A method as claimed in claim 4 wherein said tin halide is stannous chloride.

References Cited

UNITED STATES PATENTS

| | | |
|---|---|---|
| 2,564,677 | 8/1951 | Davis. |
| 2,564,706 | 8/1951 | Mochel. |

JULIUS FROME, *Primary Examiner.*

L. HAYES, *Assistant Examiner.*

U.S. Cl. X.R.

252—518